Patented Mar. 11, 1952

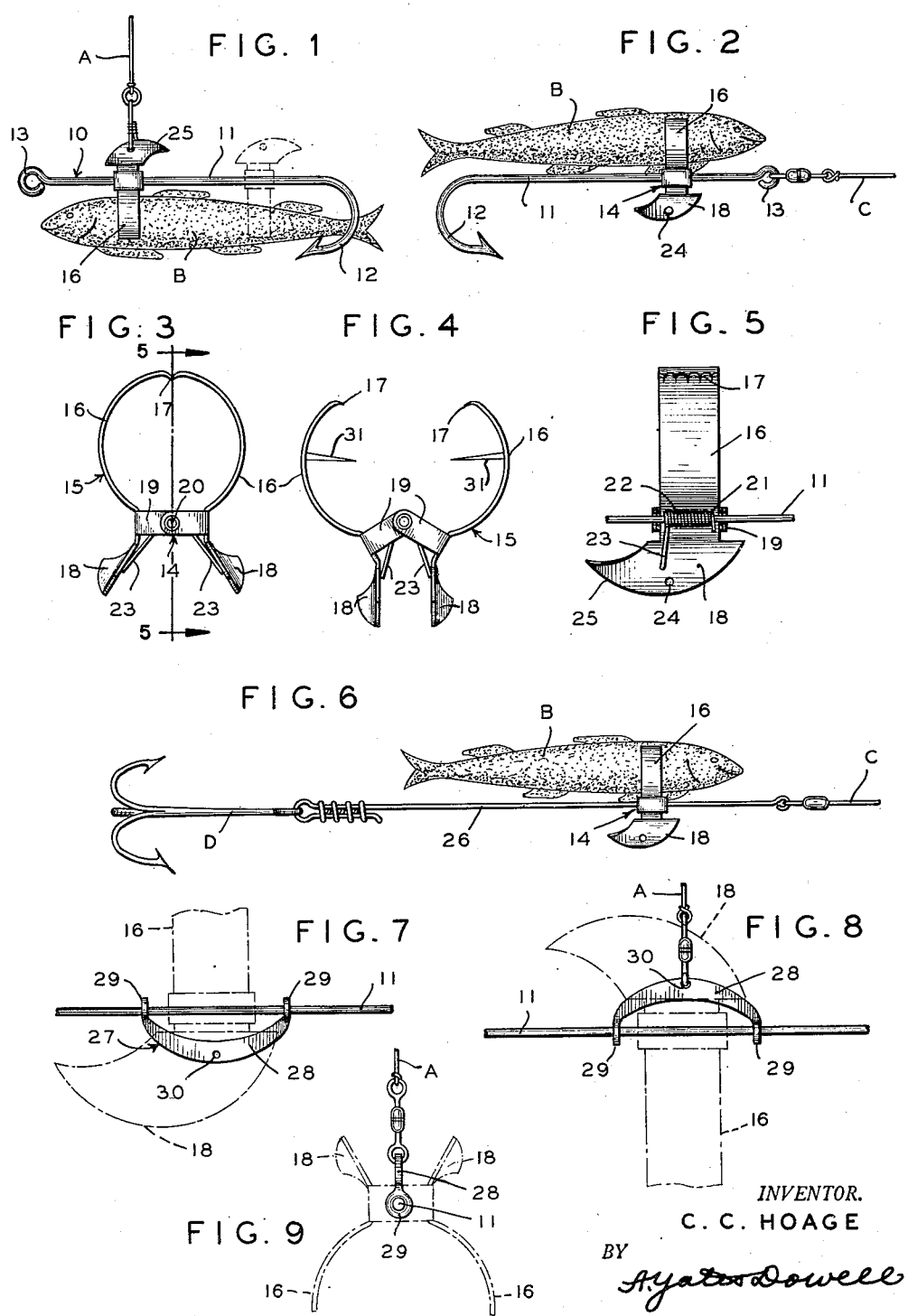

2,588,526

UNITED STATES PATENT OFFICE 2,588,526

BAIT HOLDER

Clyde C. Hoage, Ely, Minn.

Application January 11, 1949, Serial No. 70,241

5 Claims. (Cl. 43—44.6)

This invention relates to fishing and more particularly to a holder for live bait by means of which the same may be used together with a hook to catch fish. Fishing lures have been widely used in the past, both of the inanimate variety and also the type which employ live bait. In the use of live bait it is important that the bait be permitted as much freedom as possible in order that its movements will be natural and life-like in order that the fish will be more readily attracted. In live bait holders which have been used in the past, the means for securing the bait to the hook have often so constricted the movement of the bait that much of the advantage otherwise obtained through the use of live bait has been lost.

It is important that the bait holder be so constructed that it may be used either for trolling or for still fishing, and that the bait be permitted the maximum possible movement when used in either type of fishing.

Accordingly it is an object of the present invention to supply a holder for live bait which is so constructed as to permit the maximum possible movement thereof.

A further object of the invention is the provision of a bait holder which is adapted for either trolling or still fishing.

Another object of the invention is the provision of a holder for live bait in which the construction of the holder promotes movement of the bait through the water in a life-like manner.

These and other objects of the invention will be apparent from the following description taken in conjunction with the accompanying drawings wherein:

Fig. 1 is a side elevation illustrating the use of the device for still fishing;

Fig. 2, a side elevation illustrating the use of the device for trolling;

Fig. 3, an end view showing the clasps of Figs. 1 and 2 in closed position;

Fig. 4, a modified clasp in open position;

Fig. 5, a section on line 5—5 of Fig. 3;

Fig. 6, a view similar to Fig. 2 in which a modified form of hook is included;

Fig. 7, a side elevation of a modification;

Fig. 8, a side elevation of the device shown in Fig. 7 as employed for still fishing; and Fig. 9, an end view of the device shown in Fig. 8.

With continued reference to the drawings, the bait shown includes a hook 10 having an elongated shank portion 11, a barbed bill portion 12, and an eye 13 for attachment to a line. Mounted on the shank 11 is a holder or clasp 14 which includes complementary holding or jaw members 15 each of which has a bait encircling arcuate portion 16 with a serrated or tooth portion 17 at one end and a handle portion 18 at the other end. Intermediate the arcuate portion and the handle portion of each of the members 15 arms 19 project, and the arms 19 overlap when in assembled position. The free ends of each of the arms 19 are provided with pivot apertures 20.

A coil spring member 21 having a body portion 22 and extended ends 23 is positioned between the arms 19 with the ends 23 bearing against the inside walls of the opposed handle portion 18, as shown in Figs. 3 and 4. The spring 21 and the clasp are mounted on the shank of the hook so that the shank passes through the apertures 20 of the arms and the axial opening in the body of the spring 22. An aperture 24 is provided in the handles 18 in order that a line A for still fishing can be attached thereto, as shown in Fig. 1.

The handle portion 18 of each of the jaws is curved to provide an extended surface to effect a zigzag motion of the device while in the water simulating the natural movements of the live bait. To this end the handles have extended fin like portions 25, as best seen in Fig. 5, and are curved to provide concave surfaces so that water passing the handles will meet a varying resistance to its flow. Fins 25 may be readily bent by the fisherman to assume different angles to vary the action of the device.

When the clasps and spring are mounted on the shank of the hook and the spring is under substantial compression, as occurs when the clasps are partially opened, the spring is held tightly against the shaft of the hook, thus frictionally restraining movement of the spring and clasp on the hook. When the clasp is closed, however, the spring is under slight compression and the spring and clasp are relatively free to move on the hook. Thus the device may be adjusted to assume different positions on the hook shank and may be fixed at different angles relative to the bill of the hook.

In the use of the device therefore the operator can easily position the clasp on the hook in any desirable position and when the clasp is opened to receive the bait it is frictionally held against movement on the hook. As the clasp is held at least partly open so long as any bait is in the holder, it will remain in the original position while the bait retains its position.

In Fig. 1 a method of employing the device for still fishing is shown in which a line A is attached to the apertures 24 of the handles 18 and the clasp 14 is so positioned on the hook that the entire assembly is substantially balanced. With the assembly in balance the bait is kept on a substantially even keel, and its movement is not impeded due to being weighed down at either end.

Fig. 2 illustrates one method of using the device for trolling in which the line C is attached to the eye 13 of the hook and the fish or other bait B is positioned above the hook so that the fins 25 can perform their function. As the device is dragged through the water the resistance of the handles 18 thereto tends to induce a zigzag movement of the assembly and this may be emphasized or aided by the wriggling of the live bait which will constantly struggle to free itself.

The device shown in Fig. 6 is similar except that a snag hook D is detachably secured to the end of a wire leader 26 to which the clasp is also attached. This arrangment is designed for trolling.

Figs. 7, 8 and 9 illustrate a modification of the device in which a stabilizer 27 of U-shape having an arcuate body portion 28 and offset parallel legs or end members 29 is pivotally supported on the shank of the hook by means of apertures in the members 29. The apertures in the end members are of sufficient size relative to the hook shank so that the stabilizer is freely rotatable on the shank. In use the stabilizer is positioned straddling the handles 18 of the clasp as shown in Fig 7. An aperture 30 is provided approximately midway of the body portion 28 of the stabilizer to which a line swivel may be attached, as shown in Figs. 8 and 9.

In the operation of the device shown in Fig. 7 the stabilizer assists in trolling by acting as a lower fin or keel for the device and when employed for still fishing (as shown in Figs. 8 and 9) serves as an attaching means for the line in order that the clasp and the bait will be free to follow their natural movements about the axis of the hook shank rather than being under strain by being attached to the line.

It is apparent that the present invention includes the provision of a holder for use with a fishing hook for securing live bait such as a minnow, crawfish, frog, shrimp or the like, and in such a way that the maximum freedom of movement of the bait is permitted.

As will be apparent from Fig. 4 the curved jaws may be opened very wide, thus making it possible to use a wide range of bait sizes with the device. In all positions the bait is held by contact of the serrated edges or teeth 17 only, the curved surfaces of the jaws being more or less free of contact with the bait. The spring tension is such that the minnow or other bait is not injured but is held relatively gently yet firmly enough to obviate the possibility of freeing itself.

A further modification is hown in Fig. 4, for securing a small bait in the device in the same manner as an ordinary sized lure. Two additional compensating teeth 31 may be added to the inner surfaces of the arcuate encircling portions 16, and it will readily be seen that the smaller bait, will be held in the desired position by said teeth. A bait, having a diameter larger than that of the closed encircling portion will be held by the teeth 17, and a bait smaller than said encircling portion will be likewise held in position by the compensating teeth 31.

It will be understood that many changes may be made in the bait holder and I do not wish to be limited to the particular forms of the invention described and shown herein.

What is claimed is:

1. A holder for live bait comprising a pair of complementary clasps each having an arcuate portion for surrounding the bait and a tooth portion on the outer ends for securing engagement with the bait, a handle portion extending from each of the arcuate portions and curved to provide substantial resistance to water, a strap portion extending from each of the clasp members and intermediate of the arcuate portion and the handle portion, the free ends of each of the strap portions overlapping and being provided with an aperture, a hook having its shank positioned in said aperture, a coil spring positioned between the complementary clasp members and having extended ends, the coil spring being aligned with the apertures and the strap portions and snugly fitting the shank of the hook and the extended ends being in engagement with the handles to normally urge the clasps to closed position, the parts being so constructed and arranged that the spring and clasps when in closed position are relatively free to move on the hook shank and in open position the spring and clasp are in frictional engagement with and hence are immovable on the hook shank.

2. The invention as defined in claim 1 in which a stabilizer is provided having an arcuate body portion positioned between the handles of the clasp and having end portions supported for free rotation on the hook shank, the arcuate body portion being provided with an aperture for attachment to a line in order that the clasp and bait may be supported without restraint from the line.

3. In combination with a hook having a shank, a pair of jaws mounted on said shank and having serrated edges for gripping live bait along serrated edges only so that the major portion of the bait is free to wriggle, a coil spring acting on both jaws to cause them to close toward bait-gripping position, said coil spring fitting said hook shank so that when the jaws are opened by the presence of a bait gripped between them the coil spring will frictionally lock upon the hook shank but when the jaws are in contact with each other the coil spring is loose upon the hook shank and the jaws may be positioned as desired on said shank, each jaw having an integral handle, said handles permitting opening of the jaws against the resistance of the coil spring to place bait between them, and the handles each having an extension with curved surfaces to cause the bait and hook to move with a zigzag motion when the parts are drawn through the water.

4. The combination with a fish hook having a shank, a pair of jaw members arranged in face to face relation pivoted intermediate their ends on said shank, one end of each jaw member being provided with means to engage live bait, the other ends of said jaw members diverging to provide handles for operating the jaw members, a spring positioned between said jaw members and supported therebetween for urging said bait engaging ends of said jaws together, a U-shaped stabilizer positioned intermediate the handles with the legs embracing said jaws and pivotally mounted on said shank, and means in the bight of said stabilizer for attaching a fish line.

5. A bait holder comprising a fish hook having a shank, a pair of jaws mounted on said shank for movement toward and away from each other for retaining bait therebetween, and a stabilizer pivotally secured directly to said shank extending in a direction at a right angle to the plane of said jaws, said stabilizer being provided with means for attachment of a fish line thereto whereby said shank may be supported in horizontal position.

CLYDE C. HOAGE.

REFERENCES CITED

The following references are of record in the file of this patent:

UNITED STATES PATENTS

| Number | Name | Date |
|---|---|---|
| 600,241 | Walker | Mar. 8, 1898 |
| 996,886 | Schneider | July 4, 1911 |
| 1,324,109 | Dutes | Dec. 9, 1919 |
| 1,844,774 | Locki | Feb. 9, 1932 |
| 2,425,587 | Zuravsky | Aug. 12, 1947 |

FOREIGN PATENTS

| Number | Country | Date |
|---|---|---|
| 367,701 | Great Britain | Feb. 25, 1932 |